May 20, 1930.  L. SPINO ET AL  1,759,719
ELASTIC TENSION DEVICE
Filed April 20, 1928
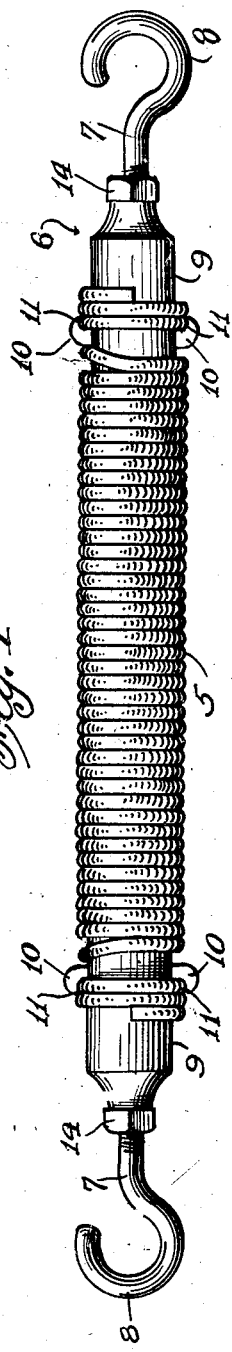
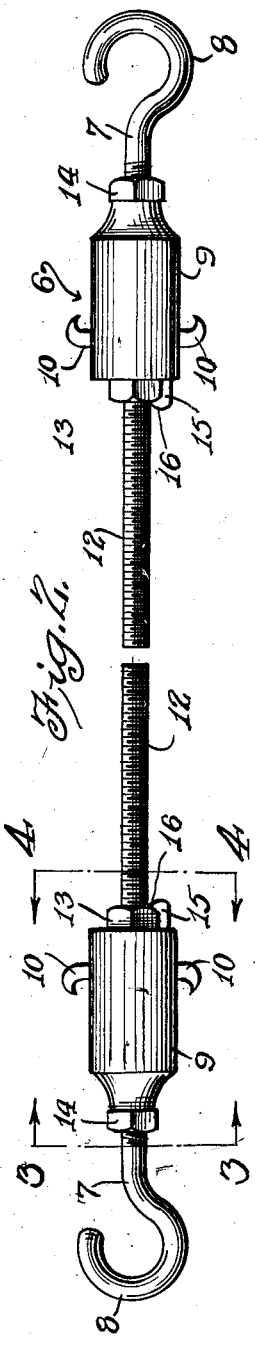
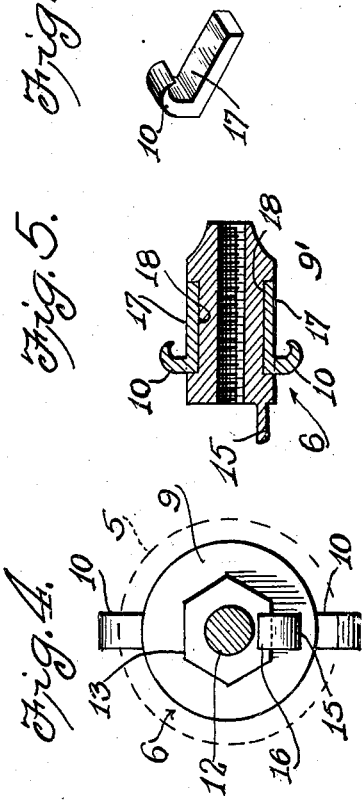
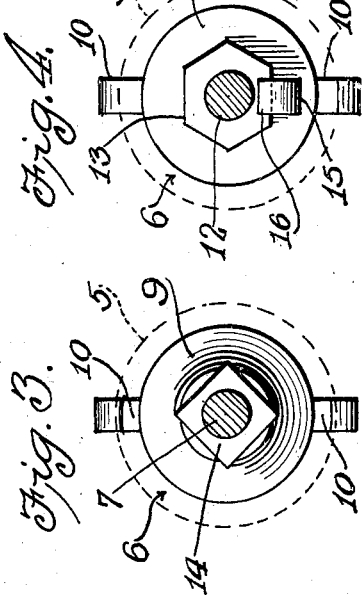
INVENTOR.
L. Spino
BY J. Nicoletta
F. L. Bryant
ATTORNEY.

Patented May 20, 1930

1,759,719

UNITED STATES PATENT OFFICE

LEON SPINO AND JOSEPH NICOLETTA, OF CLYDE, NEW YORK

ELASTIC TENSION DEVICE

Application filed April 20, 1928. Serial No. 271,586.

This invention relates to improvements in elastic tension devices particularly adapted to form a yieldable connection between parts of various devices, machinery, and the like.

The primary object of the present invention is to provide a device of the above kind which is extremely simple and durable in construction, efficient in use and capable of ready and economical manufacture and assembly.

Another object is to provide a tension device of the above kind embodying a helical tension spring and attaching elements secured to the ends of said spring, said attaching elements embodying longitudinally adjustable engaging members for maintaining a given desired length of the connecting device even though the spring may have become shortened by reason of breaking at an end thereof.

Still another object is to provide simple and efficient means for readily connecting or disconnecting the ends of the spring to or from the attaching elements.

A still further object is to provide simple and efficient means for securing the engaging members of the attaching elements in any desired position of adjustment.

Other objects will appear as the nature of the invention is better understood, and the same consists in the novel form, combination and arrangement of parts hereinafter more fully described, shown in the accompanying drawing and claimed.

In the drawing:—

Figure 1 is a side elevational view of the elastic tension device embodying the present invention;

Figure 2 is a similar view with the tension spring omitted;

Figure 3 is an enlarged transverse section on line 3—3 of Figure 2;

Figure 4 is an enlarged transverse section on line 4—4 of Figure 2;

Figure 5 is a central longitudinal section of a modified form of attaching block for the end attaching elements; and Figure 6 is a perspective view of one of the detachable securing elements of the attaching block shown in Figure 5.

Referring more in detail to the drawing, the present elastic tension device is shown as embodying a helical tension spring 5 having normally contiguous convolutions, and attaching elements 6 secured to the ends of the spring 5 and provided with longitudinally adjustable engaging members 7 preferably having their outer ends in the form of hooks 8 for detachable engagement with the parts of the device or machine to be yieldingly connected.

As shown, each end attaching element 6 consists of a cylindrical attaching block or nut member 9 adapted to snugly removably fit in the adjacent end of the spring 5 and provided with oppositely disposed laterally projecting malleable lugs 10 adapted to be entered between adjacent convolutions of the spring 5 at the end of the latter by relatively turning the block 9 and spring 5 about their longitudinal axes when placed together. When the block 9 has been entered a sufficient distance into the spring 5 with the lugs 10 engaged between adjacent convolutions of the spring 5 as shown in Figure 1, so as to effect a firm connection between the spring and the attaching element, the connection is secured by clinching the free ends of the lugs 10 outwardly over the adjacent convolution of the spring outwardly thereof as indicated at 11. As the lugs 10 are malleable, they may be pried open or released by the use of a suitable tool for being again secured to the end of the spring 5 in case an end portion thereof should become broken. Such breaking of the spring necessarily results in shortening thereof, and in order to effect a maintenance of the same effective length of the tension device after such occurrence, the engaging member 7 is longitudinally adjustable relative to the attaching block 9. For this purpose, each engaging member 7 preferably consists of an elongated screw threaded shank 12 adjustably threaded through an axial bore of the attaching block 9, so that by turning the member 7 relative to the block 9, it may be adjusted inwardly or outwardly to vary the effective length of the elastic tension device. Obviously, such adjustment may also serve the purpose of varying the tension between the connected parts of the machine or the like.

Jamb nuts 13 and 14 are preferably threaded upon the stem 12 against opposite ends of the block 9 to secure the engaging member 7 in any desired longitudinally adjusted position relative to the block 9, means being associated with the nut 13 for locking it in holding position against the inner end of the block 9 to lock the member 7 in adjusted position. As shown, this locking means preferably consists of a further malleable lug 15 provided on the inner end of the block 9 and adapted to be forced inwardly against the adjacent side of the nut 13 as well as to have its free inner end clinched as at 16 over the inner end of the nut 13 as shown in Figure 2.

While the lugs 10 are shown in Figures 1 to 4 inclusive as integrally formed on the attaching block 9, they may be formed on the inner ends of separate plates 17 removably seated in suitable recesses 18 provided in opposite sides of the block member 9' as shown in Figures 5 and 6. In this way, separate securing elements may be had which are renewable when broken, the plates 17 being preferably seated in the recesses 18 flush with the outer surface of the block 9' to permit free turning of the latter relative to the spring 5 when assembling the parts. Obviously, the convolutions of the spring positioned outwardly of the lugs 10 of the plates 17 will serve to hold the latter in the recesses 18 in this form of construction.

In use, the engaging members 7 are longitudinally adjusted to the desired position and locked in such position, whereupon the hook members 8 are engaged with the respective parts to be connected so as to provide a yielding connection therebetween under the desired tension.

What we claim as new is:—

1. An elastic tension device comprising a helical tension spring having closely related convolutions, and an attaching element secured to each end of said spring, each attaching element including an attaching block removably connected to the spring and having an axial threaded opening, an engaging member embodying a stem adjustably threaded in the opening of the block and having means for connecting its outer end to one of a pair of parts to be connected by the tension device, lateral malleable lugs on opposite sides of the attaching block passing outwardly between adjacent convolutions of the spring and clinched over one of said convolutions, said block having recesses in opposite sides thereof, and plates removably countersunk in said recesses and having said lugs formed on the inner ends thereof.

2. An elastic tension device comprising a helical tension spring having closely related convolutions, and an attaching element secured to each end of said spring, each attaching element including an attaching block removably connected to the spring and having an axial threaded opening, an engaging member embodying a stem adjustably threaded in the opening of the block and having means for connecting its outer end to one of a pair of parts to be connected by the tension device, a jamb nut threaded on the stem at the inner end of the block, and a malleable lug on the inner end of the block pressed against said jamb nut to hold it adjusted against the block and thereby secure the stem in any position of adjustment relative to the block.

3. An elastic tension device comprising a helical tension spring having closely related convolutions, and an attaching element secured to each end of said spring, each attaching element including an attaching block removably connected to the spring and having an axial threaded opening, an engaging member embodying a stem adjustably threaded in the opening of the block and having means for connecting its outer end to one of a pair of parts to be connected by the tension device, a jamb nut threaded on the stem at the inner end of the block, and a malleable lug on the inner end of the block pressed against said jamb nut to hold it adjusted against the block and thereby secure the stem in any position of adjustment relative to the block, said last named lug having its free end clinched over the inner end of said jamb nut.

In testimony whereof we affix our signatures.

LEON SPINO.
JOSEPH NICOLETTA.